United States Patent
DeCusatis et al.

(10) Patent No.: US 9,118,573 B2
(45) Date of Patent: *Aug. 25, 2015

(54) MULTIPATH EFFECTUATION WITHIN SINGLY CONTIGUOUS NETWORK FABRIC VIA SWITCHING DEVICE ROUTING LOGIC PROGRAMMING

(75) Inventors: Casimer M. DeCusatis, Poughkeepsie, NY (US); Keshav G. Kamble, Fremont, CA (US); Abhijit P. Kumbhare, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 185 days.

This patent is subject to a terminal disclaimer.

(21) Appl. No.: 13/485,428

(22) Filed: May 31, 2012

(65) Prior Publication Data

US 2013/0322454 A1 Dec. 5, 2013

(51) Int. Cl.
*H04L 12/28* (2006.01)
*H04L 12/735* (2013.01)

(52) U.S. Cl.
CPC .......... *H04L 45/128* (2013.01); *H04L 45/1283* (2013.01)

(58) Field of Classification Search
CPC .............. H04L 45/128; H04L 45/1283; H04L 45/1287
USPC ......... 370/238, 248, 254, 255, 351, 400, 401; 709/238, 244
See application file for complete search history.

(56) References Cited

U.S. PATENT DOCUMENTS

| | | | |
|---|---|---|---|
| 7,349,350 B2* | 3/2008 | Liu | 370/255 |
| 7,836,332 B2* | 11/2010 | Hara et al. | 714/5.11 |
| 7,953,865 B1 | 5/2011 | Miller et al. | |
| 8,046,456 B1 | 10/2011 | Miller et al. | |
| 8,108,454 B2 | 1/2012 | Snively et al. | |
| 8,792,474 B2 | 7/2014 | Decusatis | |
| 2003/0033427 A1* | 2/2003 | Brahmaroutu | 709/238 |
| 2004/0156399 A1* | 8/2004 | Eran | 370/913 |
| 2005/0010688 A1* | 1/2005 | Murakami et al. | 709/245 |
| 2005/0271038 A1* | 12/2005 | Xin et al. | 370/351 |
| 2006/0198323 A1* | 9/2006 | Finn | 370/256 |
| 2006/0271706 A1* | 11/2006 | Dugan et al. | 709/245 |
| 2007/0053283 A1* | 3/2007 | Bidwell et al. | 370/216 |
| 2007/0127421 A1* | 6/2007 | D'Amico et al. | 370/338 |

(Continued)

OTHER PUBLICATIONS

Krishna Nibhanupudi et al., "Data Center Ethernet: Implementing Fibre Channel Hard Zoning on Ethernet Networks," CSE 533: Project Report Spring 2009, pp. 1-19.

(Continued)

*Primary Examiner* — Ajay Cattungal
(74) *Attorney, Agent, or Firm* — Mark Vallone

(57) ABSTRACT

Each of a network fabric controller device and a network fabric forwarder devices includes network connecting hardware and network managing logic. The network connecting hardware of the devices connects them to a singly contiguous network fabric including switching devices that route data between initiator nodes and target nodes and that have routing logic programmable by the controller device. The controller device does not directly route the data themselves. The network managing logic of the devices effects multipaths for transmission of the data through the singly contiguous network fabric from the initiator node to the target nodes via programming of the routing logic of the switching devices.

13 Claims, 7 Drawing Sheets

(56) References Cited

U.S. PATENT DOCUMENTS

| | | | |
|---|---|---|---|
| 2008/0159277 A1* | 7/2008 | Vobbilisetty et al. | 370/357 |
| 2009/0138577 A1 | 5/2009 | Casado et al. | |
| 2009/0274159 A1 | 11/2009 | Xia et al. | |
| 2010/0165968 A1* | 7/2010 | Shpak | 370/338 |
| 2010/0226281 A1* | 9/2010 | Ghosh et al. | 370/254 |
| 2010/0232419 A1 | 9/2010 | Rivers | |
| 2010/0257263 A1 | 10/2010 | Casado et al. | |
| 2010/0322255 A1* | 12/2010 | Hao et al. | 370/398 |
| 2011/0029973 A1* | 2/2011 | Hara et al. | 718/1 |
| 2011/0032933 A1 | 2/2011 | Eisenhauer et al. | |
| 2011/0182194 A1 | 7/2011 | Jacquet | |
| 2011/0183194 A1 | 7/2011 | Lee et al. | |
| 2011/0188511 A1 | 8/2011 | Di Benedetto | |
| 2011/0261826 A1 | 10/2011 | Armstrong et al. | |
| 2011/0271007 A1 | 11/2011 | Wang et al. | |
| 2011/0280253 A1* | 11/2011 | Habetha et al. | 370/401 |
| 2011/0305168 A1* | 12/2011 | Koide | 370/255 |
| 2012/0039604 A1 | 2/2012 | Dickens et al. | |
| 2012/0240185 A1* | 9/2012 | Kapoor et al. | 726/1 |
| 2012/0243552 A1* | 9/2012 | Goodfellow et al. | 370/419 |
| 2013/0194963 A1 | 8/2013 | Hampel | |
| 2013/0250770 A1 | 9/2013 | Zou et al. | |
| 2013/0322292 A1 | 12/2013 | DeCusatis | |
| 2013/0322443 A1 | 12/2013 | Dunbar et al. | |
| 2013/0322447 A1 | 12/2013 | DeCusatis | |
| 2013/0322454 A1 | 12/2013 | DeCusatis | |
| 2013/0322460 A1 | 12/2013 | DeCusatis | |
| 2013/0329601 A1 | 12/2013 | Yin et al. | |
| 2014/0286340 A1 | 9/2014 | DeCusatis | |

OTHER PUBLICATIONS

David Melman et al., "FCoE over Trill," Network Working Group, Internet-Draft ("work in progress"), Sep. 11, 2011, pp. 1-12.

A. Tavakoli et al., "Applying NOX to the Datacenter," Proc. HotNets, NY, NY, Oct. 2009, 6 pages.

Mysore et al., "PortLand: A Scalable Fault-Tolerant Layer 2 Data Center Network Fabric," SIGCOMM'09, Aug. 17-21, Barcelona, Spain, 2009, pp. 39-50.

Non-final office action for U.S. Appl. No. 13/829,124 dated Apr. 14, 2014.

Notice of allowance for U.S. Appl. No. 13/829,124 dated Nov. 20, 2014.

Non-final office action for U.S. Appl. No. 13/485,543 dated Jun. 6, 2014.

Notice of allowance for U.S. Appl. No. 13/485,543 dated Nov. 25, 2014.

Ex Parte Quayle Action for U.S. Appl. No. 13/827,479 dated Dec. 23, 2013.

Notice of allowance for U.S. Appl. No. 13/827,479 dated Mar. 20, 2014.

Non-final office action for U.S. Appl. No. 14/293,921 dated Nov. 21, 2014.

* cited by examiner

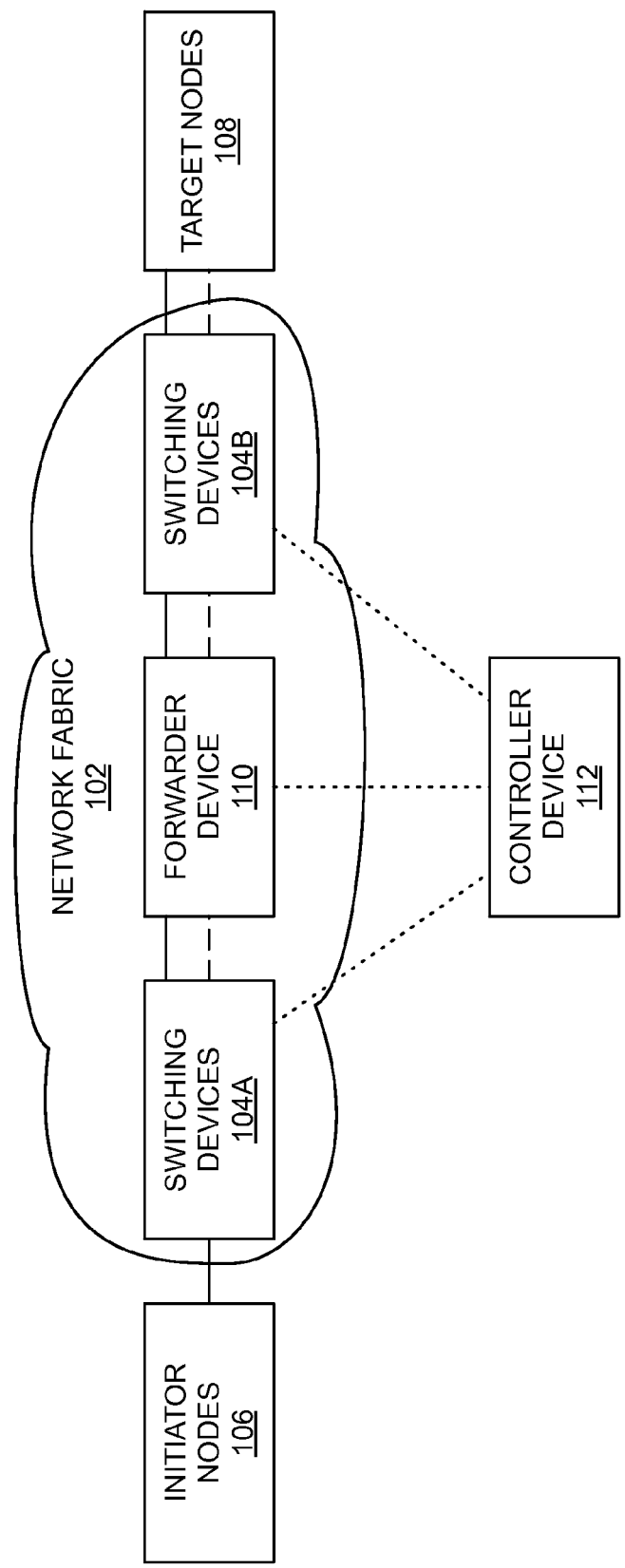

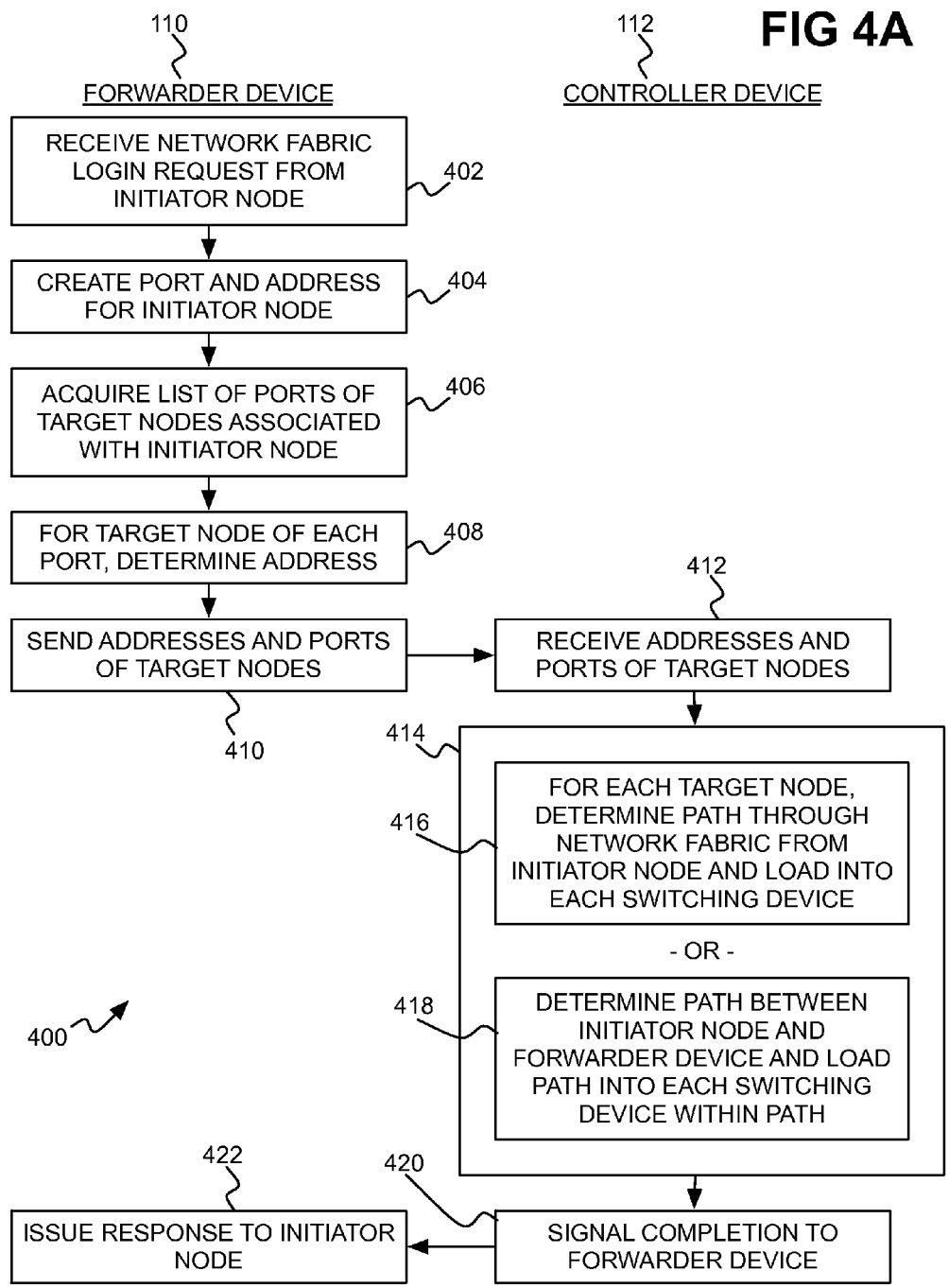

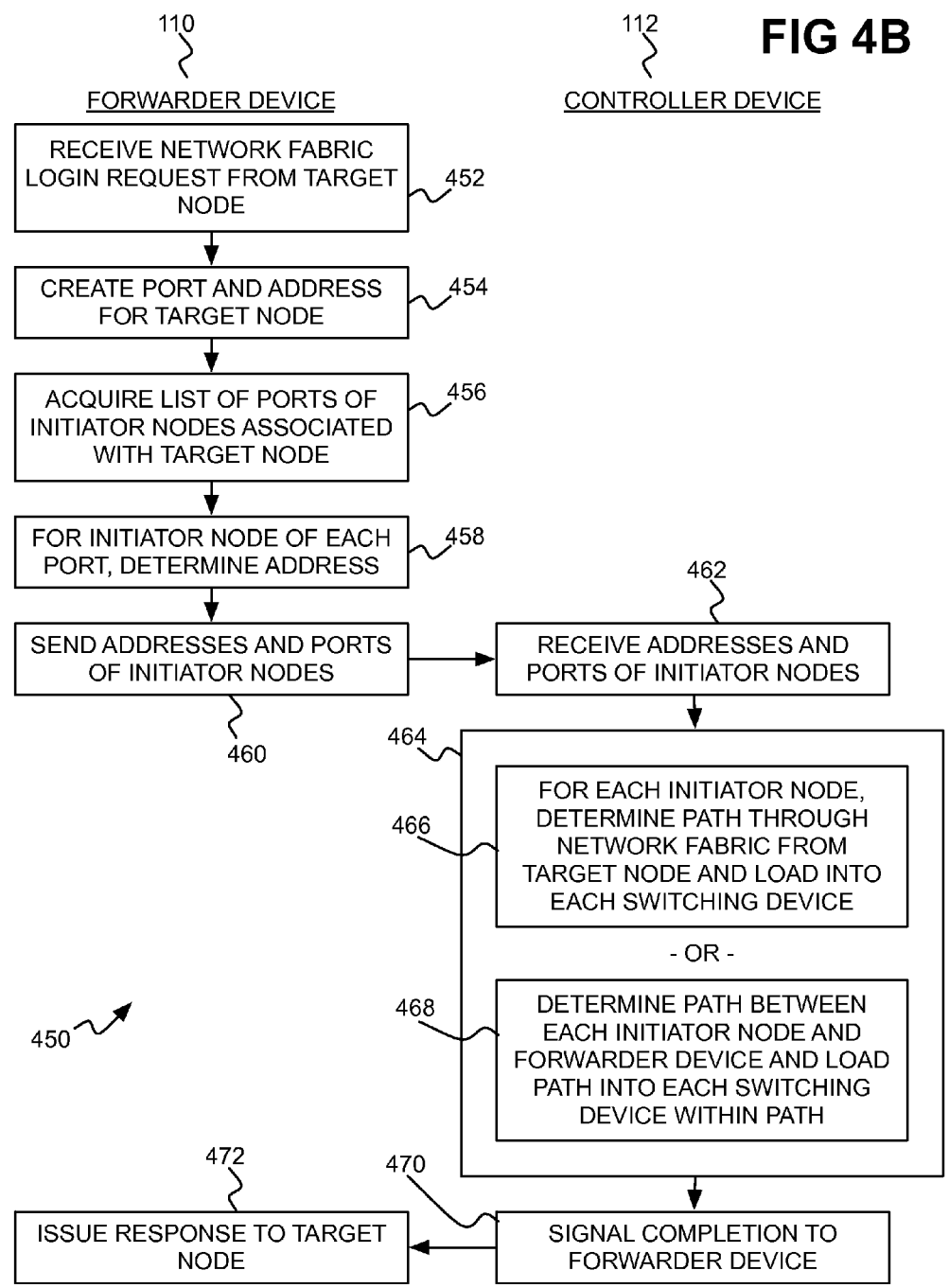

MULTIPATH EFFECTUATION WITHIN SINGLY CONTIGUOUS NETWORK FABRIC VIA SWITCHING DEVICE ROUTING LOGIC PROGRAMMING

RELATED APPLICATIONS

The present patent application is related to the patent application entitled "end-to-end multipathing through network having switching devices compatible with different protocols," filed on Mar. 14, 2013, and assigned application Ser. No. 13/827,479.

BACKGROUND

Network fabrics include devices, which are often referred to as nodes, that are interconnected to one another through a web of various switching devices like routers, hubs, switches, and so on. The network fabrics permit the devices to be interconnected for a variety of different purposes. For instance, the devices may be interconnected to implement a local-area network or a wide-area network for data transmission purposes, to implement a storage-area network, to achieve clustering, and so on.

SUMMARY

A network fabric controller device of an embodiment of the disclosure includes network connecting hardware and network managing logic. The network connecting hardware is to connect the network fabric controller device to a singly contiguous network fabric including switching devices. The switching devices are to route data between initiator nodes and target nodes, and have routing logic programmable by the network fabric controller device. The network fabric controller device does not directly route the data itself. The network managing logic is to effect multipaths for transmission of the data through the singly contiguous network fabric from the initiator nodes to the target nodes by programming the routing logic of the switching devices.

A network fabric forwarder device of an embodiment of the disclosure also includes network connecting hardware and networking managing logic. The network connecting hardware is to connect the network fabric forwarder device to a singly contiguous network fabric including switching devices. The switching devices are to route data between initiator nodes and target nodes, and have routing logic that is programmable. The network managing logic is to, together with a network fabric controller component, effect multipaths for transmission of the data through the singly contiguous network fabric from the initiator nodes to the target nodes, via programming of the routing logic of the switching devices.

BRIEF DESCRIPTION OF THE SEVERAL VIEWS OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIGS. 1A and 1B are diagrams of example networking topologies.

FIGS. 4A and 4B are flowcharts of example methods by which multipathing can be effected through a singly contiguous network fabric.

DETAILED DESCRIPTION

Figure 1A:
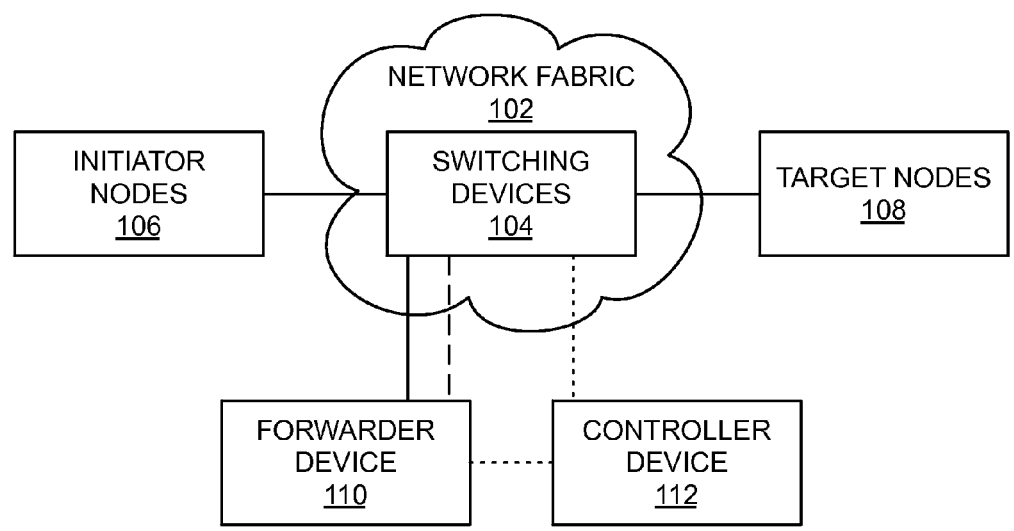

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, a network fabric includes devices, which can be referred to as nodes, that are interconnected to one another through a web of various switching devices like routers, hubs, switches, and so on. As such, the nodes can communicate with one another by transmitting data through the network fabric, and more specifically via the switching devices routing the data between the nodes. Switching devices, however, can fail, and a network fabric can otherwise be susceptible to faults that prevent data from being successfully routed among the nodes.

Therefore, it can be important to have multiple redundant paths through a network fabric, to ensure that data is successfully routed among nodes even in the presence of faults such as switching device failure. One approach to achieving this is to have two or more physically discontiguous networks within a given network fabric, with redundant switching devices in each such network. Therefore, if a particular network suffers from a fault, a different network can still be used to realize communication through the network fabric. However, maintaining such physically discontiguous networks can be overly expensive in terms of the time and cost involved in configuring, managing, and maintaining these networks.

Another approach is to provide for multipathing within a singly contiguous network fabric. In a singly contiguous network fabric, there is just one physically contiguous network of switching devices. Multipathing ensures that there are different paths between two given nodes through the network fabric. The multipaths themselves can be disjoint or shared. Shared multipaths have one or more switching devices in common, but still vary from one another. Disjoint multipaths have no switching devices in common, by comparison. Multipathing in a singly contiguous network fabric provides for the advantages of having two or more physically discontiguous networks, without the associated disadvantages.

Techniques disclosed herein provide for innovative approaches to realizing multipathing within a singly contiguous network fabric. These techniques employ a network fabric controller device and a network fabric forwarder device that can be implemented within the same physical device or at separate physical devices. The network fabric controller device does not directly route data itself. Switching devices within the network fabric are primarily responsible for routing data among nodes, although the network fabric forwarder device may also be responsible for routing data. The switching devices have routing logic that is programmable by the network fabric controller device, such that the network fabric controller device and the network fabric forwarder device together can effect multipaths for transmission of data through the singly contiguous network fabric among the nodes, via suitably programming at least the routing devices, and also network fabric forwarder device when appropriate.

In this respect, in one implementation the network fabric forwarder device can be a fiber channel (FC) or fiber channel over Ethernet (FCoE) channel forwarder (FCF) device in FC and FCoE network fabrics that may also employ FC or FCoE data-plane forwarder (FDF) devices. In such network fabrics, the FDF devices work with the switching devices, or are or are replaced by the switching devices, to route data through the fabrics. By comparison, the FCF devices control the FDF devices, but do not route the actual data themselves.

Furthermore, in one implementation the network fabric controller device can be an OpenFlow controller (OFC) device. An OFC device is employed in the context of the OpenFlow protocol maintained by the Open Networking Foundation of Palo Alto, Calif. The OpenFlow protocol permits an OpenFlow switch, or switching device, to be completely programmed by an OFC device. An OFC device thus can program OpenFlow switching devices to perform data routing as desired. While the control of the switching devices remains under the auspices of FCF devices in the context of an FC or an FCoE network fabric, the switching devices are programmed by the OFC device.

Therefore, in implementations in which the network fabric controller device is an OFC device, the network fabric forwarder device is an FCF device, and the switching devices are OpenFlow switching devices like or including FDF devices, the FCF device provides control information regarding the switching devices to the OFC device. In turn, the OFC device uses this control information to appropriately program the OpenFlow switching devices. Therefore, it is said that the OFC and FCF devices together effect multipaths for data transmission through the singly contiguous network fabric. Although it is the OFC device that actually programs the switching devices to achieve such multipathing, the OFC device performs this programming on the basis of control information that the FCF device provides.

FIGS. 1A and 1B show two example networking topologies. The networking topologies of FIGS. 1A and 1B both include a singly contiguous network fabric 102, switching devices 104, initiator nodes 106, target nodes 108, a network fabric forwarder device 110, and a network fabric controller device 112. In FIG. 1B, the switching devices 104 include switching devices 104A and switching devices 104B, which are collectively referred to as the switching devices 104. In the networking topologies of both FIGS. 1A and 1B, the switching devices 104 are considered as part of the network fabric 102, whereas in FIG. 1B the forwarder device 110 may also be considered as part of the network fabric 102.

Transmission of data within the networking topologies of FIGS. 1A and 1B is depicted by solid lines among the switching devices 104, the initiator nodes 106, and the target nodes 108. Transmission of control information within the networking topologies of FIGS. 1A and 1B is depicted by dashed lines between the switching devices and the network fabric forwarder device 110. Transmission of programming information within the networking topologies of FIGS. 1A and 1B is depicted by dotted lines among the switching devices 104, the forwarder device 110, and the network fabric controller device 112. The distinction between data, control information, and programming information is described later in the detailed description.

In the networking topology of FIG. 1A, data between the initiator nodes 106 and the target nodes 108 may be routed within the singly contiguous network fabric 102 just among the switching devices 104, and not necessarily through the network fabric forwarder device 110. By comparison, in the networking topology of FIG. 1B, data between the initiator nodes 106 and the target nodes 108 is routed within the network fabric 102 among the switching devices 104 and the forwarder device 110. For example, data originating at an initiator node 106 and intended for a target node 108 is transmitted through the network fabric 102 from one or more switching devices 104A to the forwarder device 110, and then from the forwarder device 110 to one or more switching devices 104B.

As noted above, the singly contiguous network fabric 102 is singly contiguous in that there is just one physically contiguous network of switching devices 104, as opposed to two or more physically discontiguous networks of redundant switching devices. The network fabric 102 can be an FC, an FCoE, or another type of network fabric. The network fabric 102 can implement a storage-area network, a local-area or a wide-area network for data transmission purposes, a network to achieve clustering, or another type of network.

The switching devices 104 can include routers, hubs, switches, and other types of switching devices. For instance, where the singly contiguous network fabric 102 is an FC or an FCoE network fabric, the switching devices 104 can include FDF devices. The FDF devices are typically located at edges of the network fabric 102, and are directly connected to the initiator nodes 106 and the target nodes 108. The FDF devices can then be interconnected to other types of switching devices 104, like routers or switches in particular, located within the interior and not at the edge of the network fabric 102.

The initiator nodes 106 can be logical, virtual, physical, and/or discrete devices, such as computing devices like servers, client computers and other types of client computing devices, and so on, that generally initiate data requests in relation to the target nodes 108. The target nodes 108 can be logical, virtual, physical, and/or discrete devices, also such as computing devices like servers, client computers and other types of client computing devices, and so on, that generally receive the data requests from the initiator nodes 106. For example, in the context of a storage-area network, the target nodes 106 may be or include storage devices that store data for or on behalf of the initiator nodes 106.

The network fabric forwarder device 110 may be an FCF device where the singly contiguous network fabric 102 is an FC or an FCoE network fabric, for instance. An FCF device can but does not necessarily route data within the network fabric 102. For instance, in FIG. 1B, the forwarder device 110 does route data within the network fabric 102, whereas in FIG. 1A, the forwarder device 110 may route data within the network fabric 102. An FCF device is responsible for controlling other devices within the network fabric 102, particularly the switching devices 104. In this respect, an FCF device receives, maintains, and manages control information from and of the switching devices 104, such as which ports of which switching devices 104 are connected to which parts of which other switching devices 104 and to which ports of the initiator nodes 106 and of the target nodes 108, and so on.

The network fabric controller device 112 may be an OFC device where the switching devices 104 and/or the network forwarder device 110 are OpenFlow devices. An OFC device can program the switching devices 104, for example, so that they achieve desired routing. This is described in more detail later in the detailed description. However, in general, although the switching devices 104 may have hardware to provide for fast routing of data between the initiator nodes 106 and the target nodes 108, how the switching devices 104 perform this routing is controlled by software thereof that is programmable by the OFC device. The controller device 112 does not route data within the singly contiguous network fabric 102, and does not directly receive control information from the switching devices 104, but rather indirectly receives such control information via the network fabric forwarder device 110.

In the techniques disclosed herein, the network fabric controller device 112 programs the switching devices 104 to effect multipathing between the initiator nodes 106 and the target nodes 108. This programming is based on the control information acquired by the network forwarder device 110 from the switching devices 104 and passed to the controller device 112. Therefore, in general, the forwarder device 110 communicates with the switching devices 104 to acquire control information, and passes this information to the controller device 112. On the basis of the control information, the controller device 112 determines multipaths through the network fabric 102, and suitably programs at least the switching devices 104 (and also the forwarder device 110 where appropriate, when the forwarder device 110 also routes data through the network fabric 102).

The network fabric forwarder device 110 and the network fabric controller device 112 can be implemented as separate computing devices, or within the same computing device, such as within the same server. The network fabric forwarder device 110 can also be referred to as a network fabric forwarder component, and likewise the network fabric controller device 112 can also be referred to as a network fabric controller component. In this respect, for example, a single computing device can be said to include both the network fabric forwarder component and the network fabric controller component.

Figure 2:
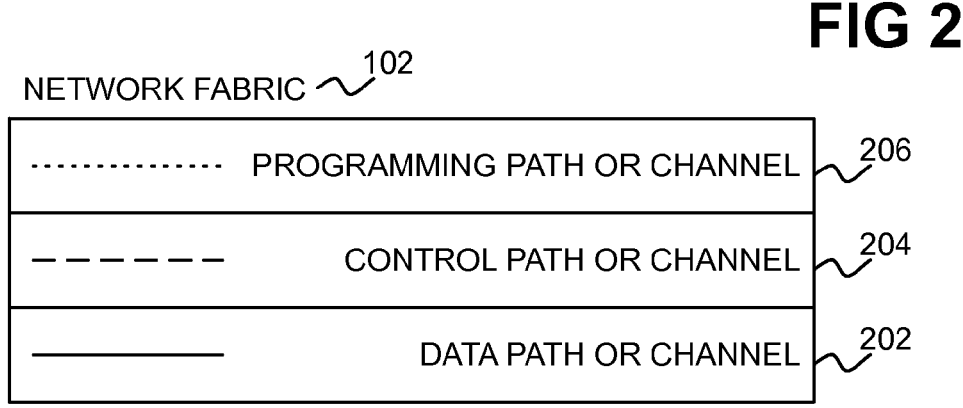
FIG. 2 is a diagram of an example logic depiction of a network fabric.

FIG. 2 logically depicts the example singly contiguous network fabric 102. The network fabric 102 logically includes three paths or channels: a data path or channel 202, a control path or channel 204, and a programmable path or channel 206. The data path or channel 202, the control path or channel 204, and the programmable path or channel 206 are respectively depicted in FIG. 2 as corresponding to solid, dashed, and dotted lines, in accordance with FIGS. 1A and 1B.

The data path or channel 202 is the path or channel of the singly contiguous network fabric 102 along which data is transmitted between the initiator nodes 106 and the target nodes 108. The control path or channel 204 is the path or channel of the network fabric 102 along which control information regarding components of the network fabric 102, such as at least the switching devices 104, is transmitted. This control information can include port information, address information, and other types of control information regarding these components. The control information can include, or can be used to determine, how the components of the network fabric 102 are interconnected to one another, for instance.

The programming path or channel 206 is the path or channel of the singly contiguous network fabric 102 by which components of the network fabric 102, such as at least the switching devices 104, are programmed. For instance, the network fabric controller device 112 can load routing tables and/or other types of programming logic into the switching devices 104. As such, the controller device 112 effectively can control how the switching devices 104 route the data through the network fabric 102 between the initiator devices 106 and the target nodes 108.

The paths or channels 202, 204, and 206 may be logical/virtual or physically discrete paths or channels. For example, there may indeed be just single hardware lines interconnecting the switching devices 104, the network fabric forwarder device 110, and the controller device 112. However, these hardware lines may have the various paths or channels 202, 204, and 206 virtually or logically overlaid thereon or defined therein. For instance, the programming path or channel 206 may be a secure socket layer (SSL) channel that uses the same hardware lines that the data path or channel 202 uses.

The switching devices 104 typically can provide fast routing of data through the network fabric 102 over the data path or channel 202. In this respect, the switching devices 104 may have dedicated routing hardware to achieve high-performance routing. The switching devices 104 have firmware or other software that is programmable by the network fabric controller device 112, though, such as in accordance with the OpenFlow protocol. Therefore, the switching devices 104 may be relatively low cost, so-called "dumb" switching devices that do not have much if any built-in logic, and instead are programmed and controlled by an external device like the controller device 112.

Figure 3A:
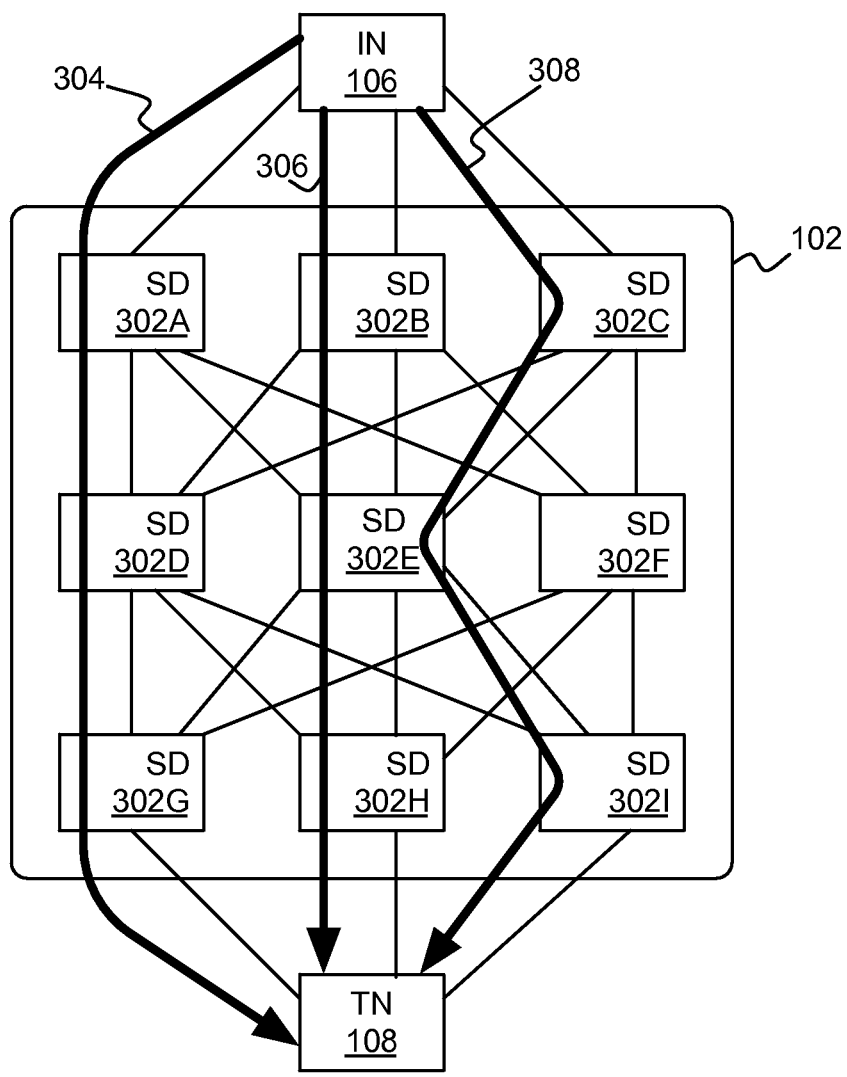
FIGS. 3A and 3B are diagrams of different example multipaths through different example singly contiguous network fabrics.
Figure 3B:
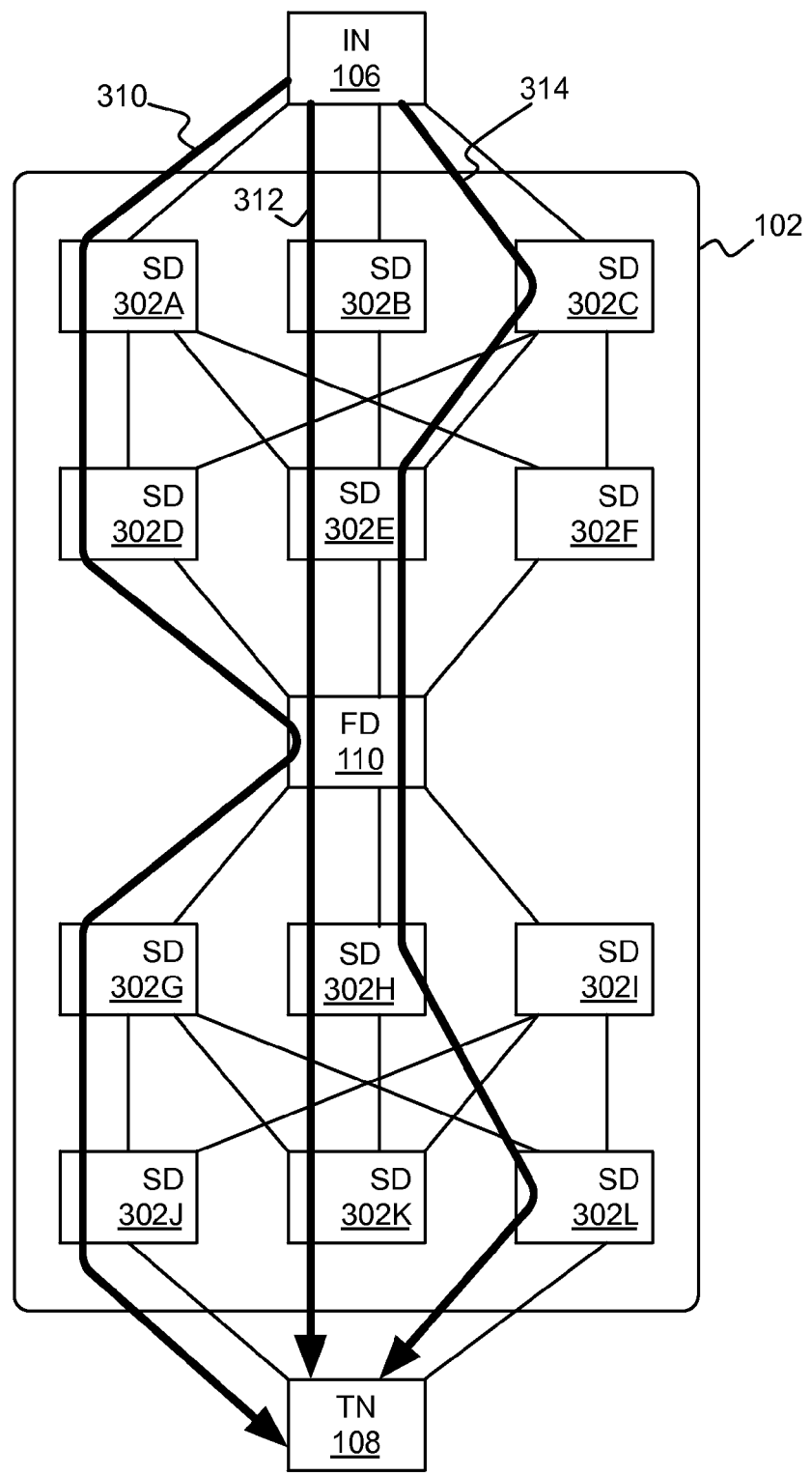

FIGS. 3A and 3B show different examples of multipathing through a singly contiguous network fabric 102. The network fabric 102 of FIG. 3A is a particular representative example of the networking topology of FIG. 1A. Similarly, the network fabric 102 of FIG. 3B is a particular representative example of the networking topology of FIG. 1B.

In FIG. 3A, the singly contiguous network fabric 102 includes nine switching devices 302A, 302B, 302C, 302D, 302E, 302F, 302G, 302H, and 302I, which are collectively referred to as the switching devices 302, and which correspond to the switching devices 104 of FIG. 1A. Each of the switching devices 302A, 302B, and 302C is connected to an initiator node 106 and to each of the switching devices 302D, 302E, and 302F. Each of the switching devices 302D, 302E, and 302F is connected to a target node 108 and to each of the switching devices 302G, 302H, and 302I.

Data originating at the initiator node 106 is transmitted through the singly contiguous network fabric 102 to the target node 108. Three example multipaths 304, 306, and 308 between the initiator node 106 and the target node 108, along which the data can be transmitted through the network fabric 102, are shown in FIG. 3A. The multipath 304 includes the switching devices 302A, 302D, and 302G. The multipath 306 includes the switching devices 302B, 302E, and 302H. The multipath 308 includes the switching devices 302C, 302E, and 302I.

The multipaths 304 and 306 are disjoint multipaths in relation to one another, because the multipaths 304 and 306 do not share any switching device 302. That is, the switching devices 302A, 302D, and 302G of the multipath 304 are mutually exclusive with the switching devices 302B, 302E, and 302H of the multipath 306. By comparison, the multipaths 306 and 308 are shared multipaths in relation to one another, because the multipaths 306 and 308 share one or more switching devices 302. In particular, the multipaths 306 and 308 share the switching device 302E.

In FIG. 3B, the singly contiguous network fabric 102 includes twelve switching devices 302A, 302B, 302C, 302D, 302E, 302F, 302G, 302H, 302I, 302J, 302K, and 302L, which are collectively referred to as the switching devices 302. The switching devices 302A, 302B, 302C, 302D, 302E, and 302F correspond to the switching devices 104A of FIG. 1B. The switching devices 302G, 302H, 302I, 302J, 302K, and 302L correspond to the switching devices 104B of FIG. 1B.

Each of the switching devices 302A, 302B, and 302C is connected to an initiator node 106 and to each of the switching devices 302D, 302E, and 302F. Each of the switching devices 302D, 302E, and 302F is connected to the network fabric forwarder device 110, which is part of the singly contiguous network fabric 102 in FIG. 3B. Each of the switching devices 302G, 302H, and 302I is connected to the forwarder device 110 and to each of the switching devices 302J, 302K, and 302L. Each of the switching devices 302J, 302K, and 302L is connected to a target node 108.

Data originating at the initiator node 106 is transmitted through the singly contiguous network fabric 102 to the target node 108. Three example multipaths 310, 312, and 314 between the initiator node 106 and the target node 108, along which the data can be transmitted through the network fabric 102, are shown in FIG. 3B. The multipath 310 includes the switching devices 302A, 302D, 302G, and 302J, as well as the network fabric forwarder device 110. The multipath 312 includes the switching devices 302B, 302E, 302H, and 302K, as well as the forwarder device 110. The multipath 314 includes the switching devices 302C, 302E, 302H, and 302L, as well as the forwarder device 110.

As to just the switching devices 302, and not also as to the network fabric forwarder device 110, the multipaths 310 and 312 are disjoint multipaths in relation to one another, because the multipaths 310 and 312 do not share any switching device 302. That is, the switching devices 302A, 302D, 302G, and 302J of the multipath 310 are mutually exclusive with the switching devices 302B, 302E, 302H, and 302K of the multipath 312. By comparison, as to just the switching devices 302, and not also as to the network fabric forwarder device 110, the multipaths 312 and 314 are shared multipaths in relation to one another, because the multipaths 312 and 314 share one or more switching devices 302. In particular, the multipaths 312 and 314 share the switching devices 302E and 302H.

FIGS. 4A and 4B show example methods 400 and 450 by which the network fabric forwarder device 110 and the network fabric controller device 112 can collaboratively effect multipathing between the initiator nodes 106 and the target nodes 108 through the singly contiguous network fabric 102. The method 400 of FIG. 4A is performed responsive to a network fabric login request received from an initiator node 106, whereas the method 450 of FIG. 4B is performed responsive to a network fabric login request received from a target node 108. The methods 400 and 450 are described both generally and in relation to a specific implementation in which the network fabric 102 is an FC or an FCoE network fabric.

In FIG. 4A, the network fabric forwarder device 110 receives a network fabric login request issued by an initiator node 106 (402). The network fabric login request can be an FC or FCoE initialization protocol (FIP) fabric login (FLOGI) request. In response, the forwarder device 110 creates a fabric network port and a fabric network address for the initiator node 106 (404). The fabric network port can be an FC N_Port identifier (ID). The fabric network address can be an Ethernet (Enet) fiber-provided media-access controller (MAC) address (FPMA).

The network fabric forwarder device 110 acquires a list of fabric network ports of target nodes 108 associated with the initiator node 106 (406), via the control path or channel 204 of the singly contiguous network fabric 102. The fabric network ports can be FC N_Port IDs. These fabric network ports can be associated with the worldwide port name (WWPN) for the initiator node 106, and may be provided in a fabric network frame, such as an FC or an FCoE frame.

For the target node 108 of each fabric network port, the network fabric forwarder device 110 determines a network fabric address (408). For instance, the forwarder device 110 can compute the Enet FPMA associated with each FC N_Port ID. The forwarder device 110 may cache this information so that the forwarder device 110 does not have to recompute the information later. The forwarder device 110 sends the network fabric ports and the network fabric addresses of the initiator node 106 and of the target nodes 108 in question to the network fabric controller device 112 (410), which receives this information (412).

The network fabric controller device 112 determines multiple paths to effect multipathing between the initiator node 106 and these target nodes 108 by performing one of the following using the provided network fabric addresses and network fabric ports (414). First, the controller device 112 can determine a path from the initiator node 106 to each target node 108, and via the programming path or channel 206 of the singly contiguous network fabric 102, load the paths into each switching device 104 within the network fabric 102 (416). For instance, the controller device 112 can determine a path from the Enet FPMA of the initiator node 106 to the Enet FPMA of each associated target node 108. The controller device 112 may employ an equal-cost multipath (ECMP) algorithm, or another type of approach, to determine the paths. Part 416 can be particularly used in conjunction with the networking topology of FIG. 1A.

Second, the network fabric controller device 112 can determine a path from the initiator node 106 to the network fabric forwarder device 110, and via the programming path or channel 206 of the singly contiguous network fabric 102 load the path into each switching device 104 within this path (418). For instance, the controller device 112 can determine a path from the Enet FPMA of the initiator node 106 to the forwarder device 110. Part 418 can be particularly used in conjunction with the networking topology of FIG. 1B. Upon effecting the multipathing of part 414, the controller device 112 signals completion to the forwarder device 110 (420), which responsively issues a response to the initiator node 106 (422), indicating that the initiator node 106 can now commence with communication through the network fabric 102.

Parts 416 and 418 thus result in the network fabric controller device 112 programming the switching devices 104 based on information provided by the network fabric forwarder device 110, to achieve disjoint or shared multipathing (as desired) between an initiator node 106 and its associated target nodes 108. Thereafter, when the initiator node 106 sends data to the target nodes 108 through the network fabric 102, the data travels along one of the multipaths that have been programmed within the switching devices 104. If one multipath suffers a fault, a different multipath can be used.

More specifically, part 416 provides for multipathing as follows. Part 416 can be performed multiple times to determine a number of paths from the initiator node 106 and each associated target node 108, from which the network fabric controller device 112 can determine which paths are disjoint or shared multipaths as desired to program into the switching devices 104. Part 418 similarly provides for multipathing. Part 418 can be performed multiple times to determine a number of paths, both between the initiator node 106 and the network fabric forwarder device 110, and between the forwarder device 110 and each associated target node 108. The controller device 112 can then determine which paths are disjoint or shared multipaths as desired to program into the switching devices 104.

In FIG. 4B, the network fabric forwarder device 110 receives a network fabric login request issued by a target node 108 (452). The network fabric login request can be an FLOGI request. In response, the forwarder device 110 creates a fabric network port and a fabric network address for the target node 108 (454). The fabric network port can be an FC N-Port ID. The fabric network address can be an Enet FPMA.

The network fabric forwarder device 110 acquires a list of fabric network ports of initiator nodes 106 associated with the target node 108 (456), via the control path or channel 204 of the singly contiguous network fabric 102. The fabric network ports can be FC N-Port IDs. These fabric network ports can be associated with the WWPN for the target node 108, and may be provided in a fabric network frame, such as an FC or an FCoE frame.

For the initiator node 106 of each fabric network port, the network fabric forwarder device 110 determines a network fabric address (458). For instance, the forwarder device 110 can compute the Enet FPMA associated with each FC N_Port ID. The forwarder device 110 may cache this information so that the forwarder device 110 does not have to recompute the information later. The forwarder device 110 sends the network fabric ports and the network fabric addresses of the initiator nodes 106 in question and of the target node 108 to the network fabric controller device 112 (460), which receives this information (462).

The network fabric controller device 112 determines multiple paths to effect multipathing between the target node 108 and the initiator nodes 106 by performing one of the following using the provided network fabric addresses and network fabric ports (464). First, the controller device 112 can determine a path from each initiator node 106 to the target node 108, and via the programming path or channel 206 of the singly contiguous network fabric 102, load the paths into each switching device 104 within the network fabric 102 (466). For instance, the controller device 112 can determine a path from the Enet FPMA of each associated initiator node 106 to the Enet FPMA of the target node 108. The controller device 112 may employ an ECMP algorithm, or another type of approach to determine the paths. Part 466 can be particularly used in conjunction with the networking topology of FIG. 1A.

Second, the network fabric controller device 112 can determine a path from each associated initiator node 106 to the network fabric forwarder device 110, and via the programming path or channel 206 of the singly contiguous network fabric 102 load the path into each switching device 104 within the path (468). For instance, the controller device 112 can determine a path from the Enet FPMA of each such initiator node 106 to the forwarder device 110. Part 468 can be particularly used in conjunction with the networking topology of FIG. 1B. Upon effecting the multipathing of part 464, the controller device 112 signals completion to the forwarder device 110 (470), which responsively issues a response to the target node 108 (472), indicating that the target node 108 can now commence with communication through the network fabric 102.

Parts 466 and 468 thus result in the network fabric controller device 112 programming the switching devices 104 based on information provided by the network fabric forwarder device 110, to achieve disjoint or shared multipathing (as desired) between a target node 108 and its associated initiator nodes 106. Thereafter, when the target node 108 sends data to the initiator nodes 106 through the network fabric 102, the data travels along one of the multipaths that have been programmed within the switching devices 104. If one multipath suffers a fault, a different multipath can be used.

More specifically, part 466 provides for multipathing as follows. Part 466 can be performed multiple times to determine a number of paths from each associated initiator node 106 and the target node 108, from which the network fabric controller device 112 can determine which paths are disjoint or shared multipaths as desired to program into the switching devices 104. Part 468 similarly provides for multipathing. Part 468 can be performed multiple times to determine a number of paths, both between each associated initiator node 106 and the network fabric forwarder device 110, and between the forwarder device 110 and the target node 108. The controller device 112 can then determine which paths are disjoint or shared multipaths as desired to program into the switching devices 104.

Figure 5:
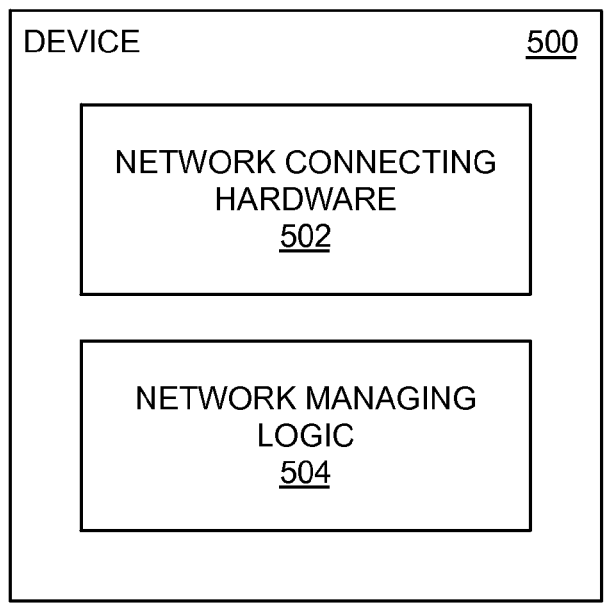
FIG. 5 is a diagram of an example implementation of a network fabric forwarder or controller device.

FIG. 5 shows an example implementation of a device 500 that represents the network fabric forwarder device 110 or the network fabric controller device 112. The device 500 includes network connecting hardware 502 and network managing logic 504. The device 500 can also include other components, in addition to the networking connecting hardware 502 and/or the network managing logic 504. The network connecting hardware 502 is hardware that connects the device 500 to the singly contiguous network fabric 102.

The network managing logic 504 performs the functionality ascribed to the network fabric forwarder device 110 in the case where the device 500 represents the forwarder device 110, and performs the functionality ascribed to the network fabric controller device 112 in the case where the device 500 represents the controller device 112. The network managing logic 504 may be implemented as software, hardware, or a combination of software and hardware. As one example, the network managing logic 504 may be a computer program stored on a computer-readable data storage medium and executable by a processor. As another example, the network managing logic 504 may be implemented as hardware, such as an application-specific integrated circuit (ASIC), a field-programmable gate array (FPGA), and so on.

It is noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A network fabric controller device comprising:
network connecting hardware to connect the network fabric controller device to a singly contiguous network fabric including a plurality of switching devices, the switching devices to route data between a plurality of initiator nodes and a plurality of target nodes, the switching devices having routing logic programmable by the network fabric controller device, the network fabric controller device not directly routing the data itself;
network managing logic to effect multipaths for transmission of the data through the singly contiguous network fabric from the initiator nodes to the target nodes by programming the routing logic of the switching devices; and
a network fabric forwarding component to connected to the switching devices, and responsive to a network fabric login request received from a given initiator node, to create a network fabric port and a network fabric address for the given initiator node, determine a network fabric address for a given target node of a network fabric port of the given target node, and transmit the network fabric addresses of the given initiator node and the given target node to the network managing logic.

2. The network fabric controller device of claim 1, wherein the network managing logic is to effect the multipaths in conjunction with the network fabric forwarding component.

3. The network fabric controller device of claim 1, wherein the network managing logic is to effect the multipaths by, where the network fabric login request is initiated by the given initiator node:
  receiving the network fabric address of the given initiator node, and the network fabric address of the given target node; and
  performing, using the network fabric addresses of the given initiator node and of the given target node, one of:
    determining one or more paths between the given initiator node and the given target node through the singly contiguous network fabric and loading the paths into a forwarding table of each switching device;
    determining a path between the given initiator node and the network fabric forwarding component through the singly contiguous network fabric and loading the path into a forwarding table of each switching device within the path.

4. The network fabric controller device of claim 1, wherein the network managing logic is to effect the multipaths by, wherein the network fabric login request is initiated by the given target node of the target nodes:
  receiving the network fabric address of the given target node, and the network fabric address of the given initiator node; and
  performing, using the network fabric addresses of the given target node and of the given initiator node, one of:
    determining one or more paths between the given initiator node and the given target node through the singly contiguous network fabric and loading the paths into a forwarding table of each switching device;
    determining one or more paths between the given initiator node and the network fabric forwarding component through the singly contiguous network fabric and loading the paths into a forwarding table of each switching device within the paths.

5. The network fabric controller device of claim 1, wherein the multipaths are each one of a shared multipath and a disjoint multipath.

6. A network fabric forwarder device comprising:
  network connecting hardware to connect the network fabric forwarder device to a singly contiguous network fabric including a plurality of switching devices, the switching devices to route data between a plurality of initiator nodes and a plurality of target nodes, the switching devices having routing logic that is programmable; and
  network managing logic to, together with a network fabric controller component, effect multipaths for transmission of the data through the singly contiguous network fabric from the initiator nodes to the target nodes, via programming of the routing logic of the switching devices,
  wherein responsive to a network fabric login request received from a given initiator node, the network managing logic is to create a network fabric port and a network fabric address for the given initiator node, determine a network fabric address for a given target node of a network fabric port of the given target node, and transmit the network fabric addresses of the given initiator node and the given target node to a network fabric controller component connected to the network managing logic.

7. The network fabric forwarder device of claim 6, further comprising the network fabric controller component.

8. The network fabric forwarder device of claim 6, wherein the network fabric controller component is implemented in a device different than and separate from the network fabric forwarder device.

9. The network fabric forwarder device of claim 6, wherein the multipaths are each one of a shared multipath and a disjoint multipath.

10. A network fabric forwarder device comprising:
  network connecting hardware to connect the network fabric forwarder device to a singly contiguous network fabric including a plurality of switching devices, the switching devices to route data between a plurality of initiator nodes and a plurality of target nodes, the switching devices having routing logic that is programmable; and
  network managing logic to, together with a network fabric controller component, effect multipaths for transmission of the data through the singly contiguous network fabric from the initiator nodes to the target nodes, via programming of the routing logic of the switching devices,
  wherein responsive to a network fabric login request received from a given target node, the network managing logic is to create a network fabric port and a network fabric address for the given target node, determine a network fabric address for a given initiator node of a network fabric port of the given initiator node, and transmit the network fabric addresses of the given initiator node and the given target node to a network fabric controller component connected to the network managing logic.

11. The network fabric forwarder device of claim 10, further comprising the network fabric controller component.

12. The network fabric forwarder device of claim 10, wherein the network fabric controller component is implemented in a device different than and separate from the network fabric forwarder device.

13. The network fabric forwarder device of claim 10, wherein the multipaths are each one of a shared multipath and a disjoint multipath.

* * * * *